(12) United States Patent
Chang (10) Patent No.: US 10,713,470 B2
(45) Date of Patent: Jul. 14, 2020

(54) METHOD OF DETERMINING IMAGE BACKGROUND, DEVICE FOR DETERMINING IMAGE BACKGROUND, AND A NON-TRANSITORY MEDIUM FOR SAME

(71) Applicant: BEIJING KINGSOFT INTERNET SECURITY SOFTWARE CO., LTD., Beijing (CN)

(72) Inventor: Hanwen Chang, Beijing (CN)

(73) Assignee: BEIJING KINGSOFT INTERNET SECURITY SOFTWARE CO., LTD., Beijing (CN)

(*) Notice: Subject to any disclaimer, the term of this patent is extended or adjusted under 35 U.S.C. 154(b) by 94 days.

(21) Appl. No.: 16/108,198

(22) Filed: Aug. 22, 2018

(65) Prior Publication Data

US 2019/0102604 A1 Apr. 4, 2019

(30) Foreign Application Priority Data

Sep. 30, 2017 (CN) .......................... 2017 1 0944351

(51) Int. Cl.
*G06K 9/00* (2006.01)
*G06T 7/11* (2017.01)
*G06T 7/194* (2017.01)
*G06K 9/62* (2006.01)

(52) U.S. Cl.
CPC ......... *G06K 9/00234* (2013.01); *G06K 9/627* (2013.01); *G06T 7/11* (2017.01); *G06T 7/194* (2017.01); *G06T 2207/20081* (2013.01); *G06T 2207/20084* (2013.01); *G06T 2207/30201* (2013.01)

(58) Field of Classification Search
None
See application file for complete search history.

(56) References Cited

U.S. PATENT DOCUMENTS

2017/0213112 A1* 7/2017 Sachs ................. G06K 9/00228

FOREIGN PATENT DOCUMENTS

| CN | 103871051 A | 6/2014 |
| CN | 105869159 A | 8/2016 |

OTHER PUBLICATIONS

Office Action issued in corresponding Chinese Application No. 201710944351.1 dated Jul. 29, 2019, and English translation thereof (14 pages).

* cited by examiner

*Primary Examiner* — Justin P. Misleh
(74) *Attorney, Agent, or Firm* — Osha Liang LLP (57) ABSTRACT

The present disclosure provides a method and an apparatus of determining an image background, a device and a medium. The method includes: recognizing a face region in an image, and obtaining a face distance based on the face region; obtaining a face distance parameter of each pixel in the image based on the face distance; processing the face distance parameter and corresponding color parameter of each pixel in the image by applying a pre-trained image region segmentation model to determine an image region type corresponding to each pixel; determining a background region of the image based on the image region type corresponding to each pixel and performing preset background image processing on the background region.

9 Claims, 6 Drawing Sheets

METHOD OF DETERMINING IMAGE BACKGROUND, DEVICE FOR DETERMINING IMAGE BACKGROUND, AND A NON-TRANSITORY MEDIUM FOR SAME

CROSS-REFERENCE TO RELATED APPLICATIONS

This application claims priority to and benefits of Chinese Patent Application Serial No. 201710944351.1, filed with the State Intellectual Property Office of P. R. China on Sep. 30, 2017, the entire content of which is incorporated herein by reference.

FIELD

The present disclosure relates to an image processing technology field, and more particularly to a method and an apparatus of determining an image background, a device and a medium.

BACKGROUND

With the popularization of terminal devices such as smart phones, a user is accustomed to photograph to record the life through the terminal device. At the same time, user requirements on a function of processing a captured image is also more and more abundant, for example, the user wants to perform background processing on the captured image such as bokeh.

SUMMARY

A first aspect of embodiments of the present disclosure provides a method of determining an image background. The method includes: recognizing a face region in an image, and obtaining a face distance based on the face region; obtaining a face distance parameter of each pixel in the image based on the face distance; processing the face distance parameter and corresponding color parameter of each pixel in the image by applying a pre-trained image region segmentation model to determine an image region type corresponding to each pixel; determining a background region of the image based on the image region type corresponding to each pixel and performing preset background image processing on the background region.

A second aspect of embodiments of the present disclosure provides a terminal device. The device includes a memory, a processor and computer programs stored in the memory and executable by the processor. When the computer programs are executed by the processor, the method of determining an image background described above is implemented.

A third aspect of embodiments of the present disclosure provides a non-transitory computer readable storage medium, having stored therein a computer program that, when executed by a processor, causes the processor to perform the method of determining an image background described above.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Embodiments of the present disclosure will be described in detail in the following. Examples of the embodiments are illustrated in the drawings. The same or similar elements and the elements having same or similar functions are denoted by like reference numerals throughout the descriptions. The embodiments described herein with reference to the drawings are explanatory, are intended to explain the present disclosure, but shall not be construed to limit the present disclosure.

A method of determining an image background, an apparatus of determining an image background, a terminal and a medium according to the embodiments of the present disclosure will be described with reference to the drawings in the following.

The method of determining an image background implemented in the present disclosure is applied to a terminal device having a photographing function. The terminal device may be a hardware device having a photographing camera such as a mobile phone, a tablet computer, a personal digital assistant, a wearable device, etc. The wearable device may be a smart bracelet, a smart watch, smart glasses, etc.

Figure 1:
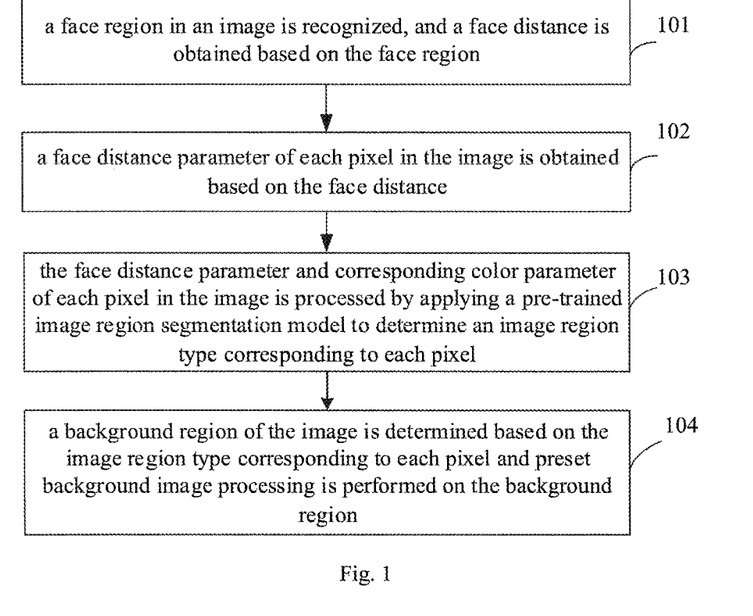
FIG. 1 is a flow char of a method of determining an image background according to an embodiment of the present disclosure.

FIG. 1 is a flow char of a method of determining an image background according to an embodiment of the present disclosure. As illustrated in FIG. 1, the method includes acts in the following blocks.

At block 101, a face region in an image is recognized, and a face distance is obtained based on the face region.

At block 102, a face distance parameter of each pixel in the image is obtained based on the face distance.

It should be understood that, since face features are more obvious than features of other regions, the face region in the image may be relatively easily obtained based on the related art. For example, the face region is determined by recognizing a coverage range of a region that is similar to the skin color in the image. For another example, the face region is determined by recognizing face features and a face contour in the image.

In the related art, when performing the background processing on the image, a contour of a photographed subject is recognized based on an image contour recognition technology, and a region outside the contour of the subject is regarded as a background region. However, this recognition method is based on pixels each which has a significant change in brightness in the image. When the brightness of the edge of the subject contour is similar to that of background pixels, it is easy to cause inaccurate recognition. Or, the background region is determined based on RGB colors of pixels in the image. However, this recognition manner cannot accurately distinguish the background region when the color of the photographed subject is closed to that of the background region. Therefore, there is a need for a method that may effectively recognize the background region in the image.

It should be noted that, as analyzed above, in the related art, if the background region is determined only based on RGB color features of pixels in the image or based on brightness features of the image, it may easily lead to inaccurate background region recognition. In order to solve the technical problem, in the embodiments of the present disclosure, another consideration parameter, a distance parameter, is introduced to facilitate to determinate the background region cooperatively. Thus, through a large number of experiments, the background region determined by combining the distance parameter has higher accuracy.

In detail, the face distance is obtained based on the face region, so as to further obtain the face distance parameter of each pixel in the image based on the face distance. Thus, a parameter value of each pixel in the image based on the distance dimension may be obtained.

It should be noted that, based on different application scenarios, contents of the face distance and the face distance parameter described above may be different. For clarity of description, the following description will be given with examples.

The first example: the face distance includes a face horizontal axis distance.

In this example, a width of a central horizontal axis of the face region is detected to obtain the face horizontal axis distance.

Figure 2:
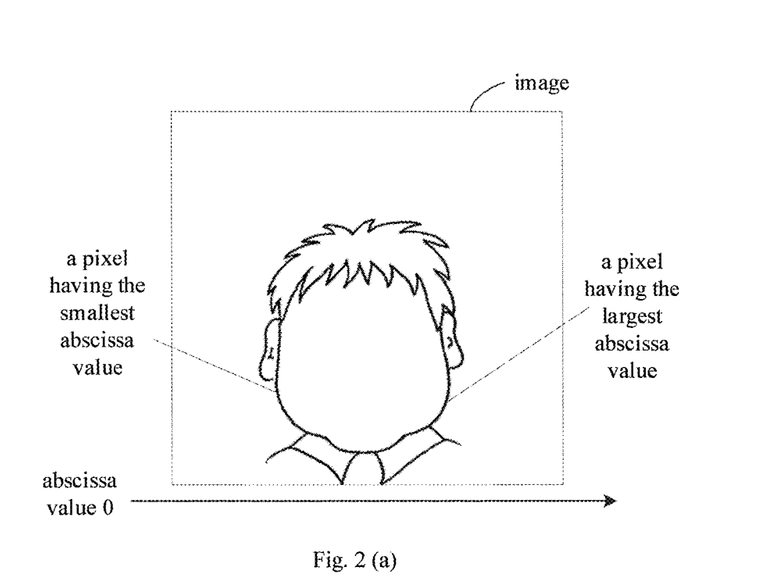
FIG. 2(a) is a schematic diagram illustrating an application scenario of a method of determining an image background according to a first embodiment of the present disclosure.
FIG. 2(b) is a schematic diagram illustrating an application scenario of a method of determining an image background according to a second embodiment of the present disclosure.
FIG. 2(c) is a schematic diagram illustrating an application scenario of a method of determining an image background according to a third embodiment of the present disclosure.

It should be noted that, in different application scenarios, different manners of detecting the width of the central horizontal axis of the face region may be used. As a possible implementation manner, as illustrated in FIG. 2(a), an abscissa value of each pixel on a contour of the face region is obtained, and a distance between a pixel having the smallest abscissa value and a pixel having the largest abscissa value is determined as the width of the central horizontal axis of the face region.

Figure 2B:
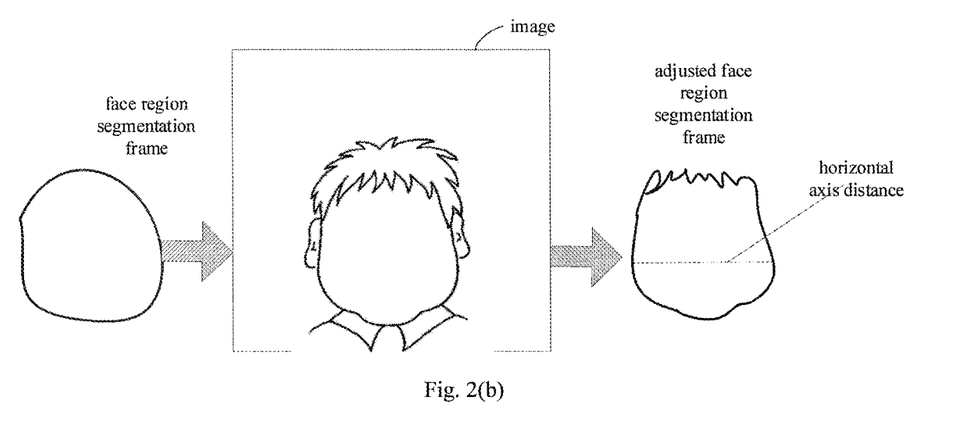

As another possible implementation manner, as illustrated in FIG. 2(b), a face region segmentation frame is established in advance. After the face region in the image is determined, the face region segmentation frame is introduced and adjusted based on the contour of the face region to obtain an adjusted face region segmentation frame. The width of the central horizontal axis of the face region is obtained based on a width of a central horizontal axis of the adjusted face region segmentation frame, so as to obtain the face horizontal axis distance.

Figure 2C:
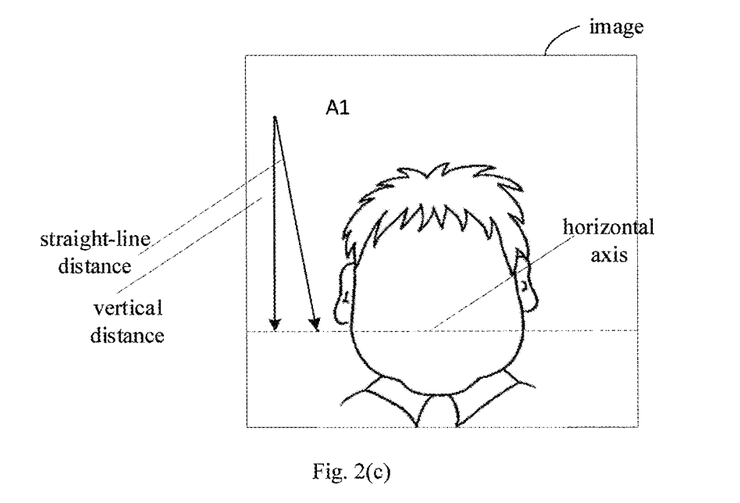

Further, in the present embodiment, a first distance from each pixel in the image to the central horizontal axis of the face region is detected, a first ratio of the first distance to the face horizontal axis distance is calculated and the first ratio is regarded as the face distance parameter of the corresponding pixel. As illustrated in FIG. 2(c), the pixel is described as A1, the first distance from each pixel to the central horizontal axis of the face region may be a vertical distance from each pixel to the central horizontal axis, or a straight-line distance from each pixel to a certain fixed point on the central horizontal axis, which is not limited herein.

The second example: the face distance includes a face vertical axis distance.

In this example, a length of a central vertical axis of the face region is detected to obtain the face vertical axis distance.

Figure 3A:
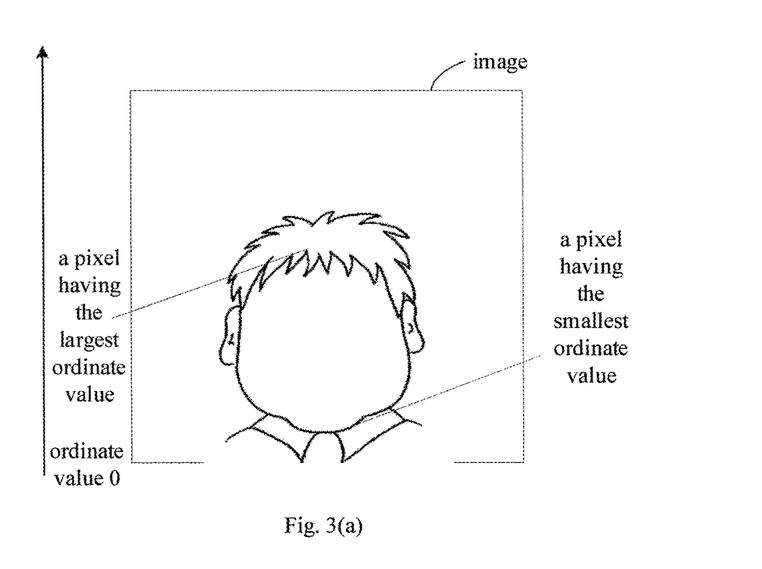
FIG. 3(a) is a schematic diagram illustrating an application scenario of a method of determining an image background according to a fourth embodiment of the present disclosure.

It should be noted that, in different application scenarios, different manners of detecting the length of the central vertical axis of the face region may be used. As a possible implementation manner, as illustrated in FIG. 3(a), an ordinate value of each pixel on a contour of the face region is obtained, and a distance between a pixel having the smallest ordinate value and a pixel having the largest ordinate value is determined as the length of the central vertical axis of the face region.

Figure 3B:
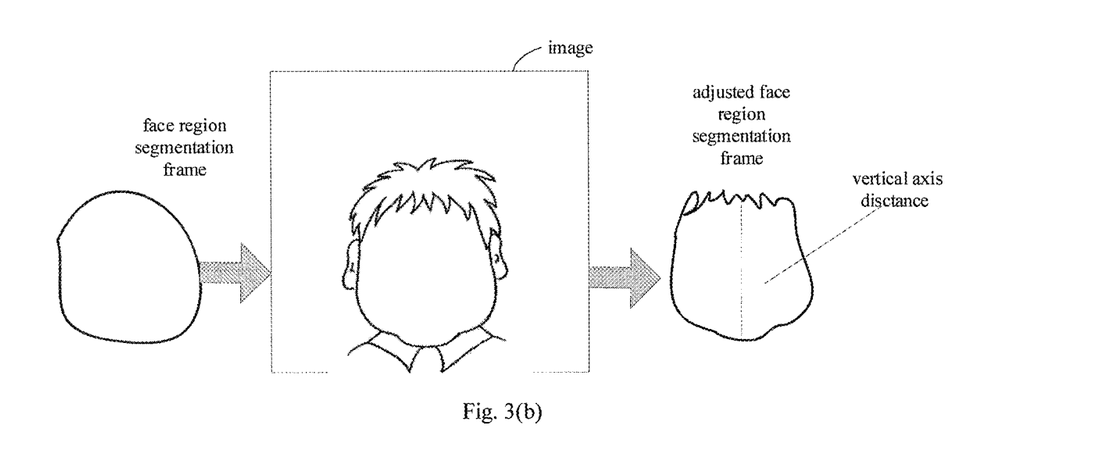
FIG. 3(b) is a schematic diagram illustrating an application scenario of a method of determining an image background according to a fifth embodiment of the present disclosure.

As another possible implementation manner, as illustrated in FIG. 3(b), a face region segmentation frame is established in advance. After the face region in the image is determined, the face region segmentation frame is introduced and adjusted based on the contour of the face region to obtain an adjusted face region segmentation frame. The length of the central vertical axis of the face region is obtained based on a length of a central center vertical axis of the adjusted face region segmentation frame, so as to obtain the face vertical axis distance.

Figure 3C:
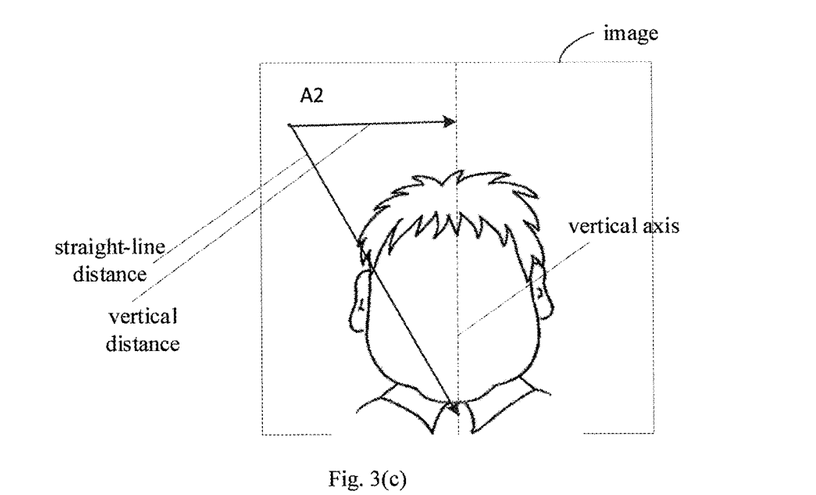
FIG. 3(c) is a schematic diagram illustrating an application scenario of a method of determining an image background according to a sixth embodiment of the present disclosure.

Further, in the present embodiment, a second distance from each pixel in the image to the central vertical axis of the face region is detected, a second ratio of the second distance to the face vertical axis distance is calculated and the second ratio is regarded as the face distance parameter of the corresponding pixel. As illustrated in FIG. 3(c), the pixel is described as A2, the second distance from each pixel to the central vertical axis of the face region may be a vertical distance from each pixel to the central vertical axis, or a straight-line distance from each pixel to a certain fixed point on the central vertical axis, which is not limited herein.

The third example: the face distance includes a face horizontal axis distance and a face vertical axis distance.

In this example, a width of a central horizontal axis of the face region is detected to obtain the face horizontal axis distance and a length of a central vertical axis of the face region is detected to obtain the face vertical axis distance.

Figure 4A:
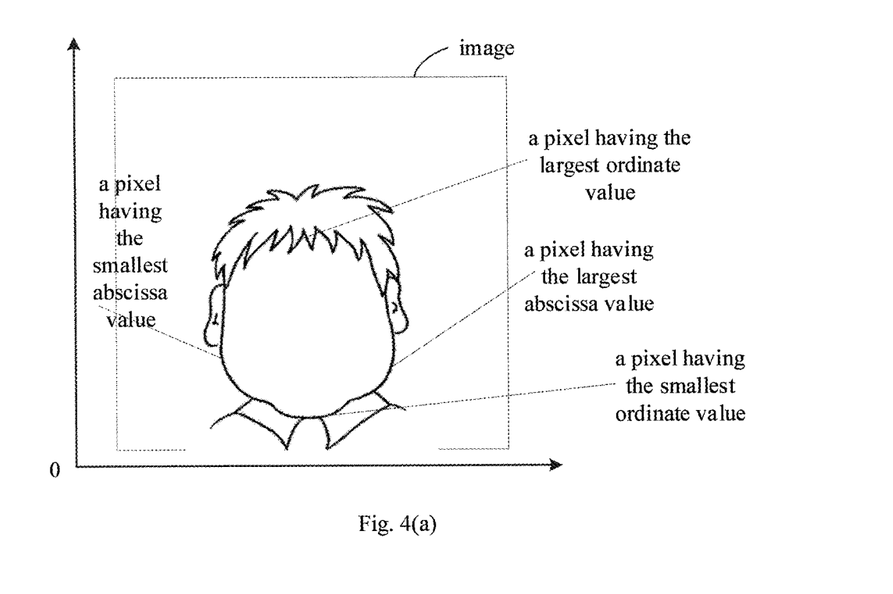
FIG. 4(a) is a schematic diagram illustrating an application scenario of a method of determining an image background according to a seventh embodiment of the present disclosure.

It should be noted that, in different application scenarios, different manners of detecting the width of the central horizontal axis of the face region and the length of the central vertical axis of the face region may be used. As a possible implementation manner, as illustrated in FIG. 4(a), an abscissa value and an ordinate value of each pixel on a contour of the face region is obtained, and a distance between a pixel having the smallest abscissa value and a pixel having the largest abscissa value is determined as the width of the central horizontal axis of the face region, and a distance between a pixel having the smallest ordinate value and a pixel having the largest ordinate value is determined as the length of the central vertical axis of the face region.

Figure 4B:
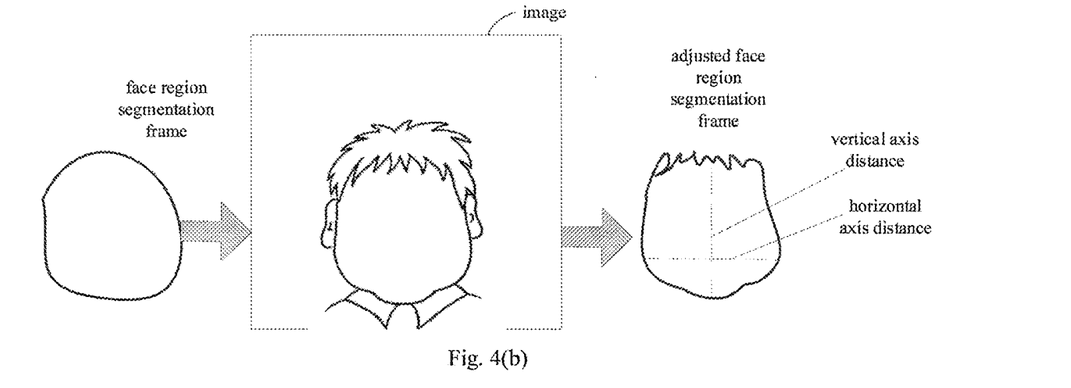
FIG. 4(b) is a schematic diagram illustrating an application scenario of a method of determining an image background according to an eighth embodiment of the present disclosure.

As another possible implementation manner, as illustrated in FIG. 4(b), a face region segmentation frame is established in advance. After the face region in the image is determined, the face region segmentation frame is introduced and adjusted based on the contour of the face region to obtain an adjusted face region segmentation frame. The width of the central horizontal axis of the face region is obtained based on a width of a central horizontal axis of the adjusted face region segmentation frame, so as to obtain the face horizontal axis distance. The length of the central vertical axis of the face region is obtained based on a length of a central center vertical axis of the adjusted face region segmentation frame, so as to obtain the face vertical axis distance.

Further, in the present embodiment, a first distance from each pixel in the image to the central horizontal axis of the face region is detected and a second distance from each pixel in the image to the central vertical axis of the face region is detected. A first ratio of the first distance to the face horizontal axis distance is calculated and a second distance of the second distance to the face vertical axis distance is calculated. The first ratio and the second ratio are regarded as the face distance parameter of the corresponding pixel. Similarly, the first distance from each pixel to the central horizontal axis of the face region may be a vertical distance from each pixel to the central horizontal axis, or a straight-line distance from each pixel to a certain fixed point on the central horizontal axis, which is not limited herein; the second distance from each pixel to the central vertical axis of the face region may be a vertical distance from each pixel to the central vertical axis, or a straight-line distance from each pixel to a certain fixed point on the central vertical axis, which is not limited herein.

At block 103, the face distance parameter and corresponding color parameter of each pixel in the image is processed by applying a pre-trained image region segmentation model to determine an image region type corresponding to each pixel.

In detail, the image region segmentation model is pre-trained based on a large amount of experimental data. The model may calculate the image region type corresponding to each pixel based on the inputted face distance parameter and corresponding color parameter of each pixel. The image region type may include a face region, a body region, a background region and the like.

Figure 5:
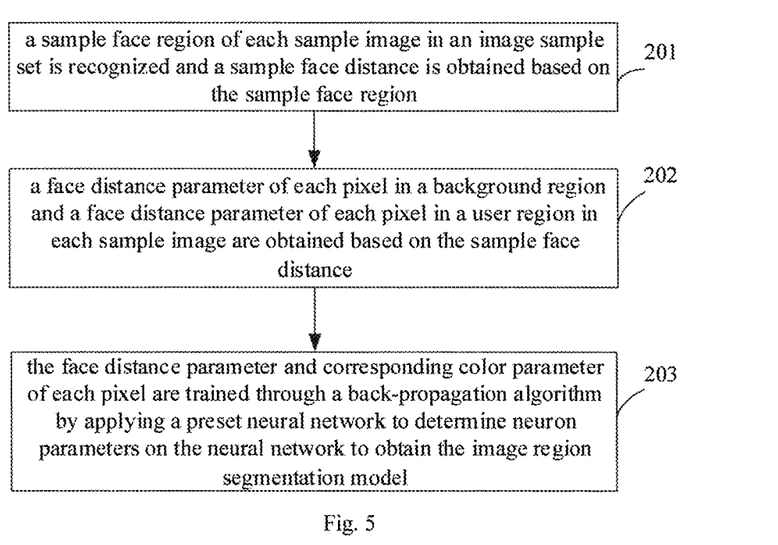
FIG. 5 is a flow char of a method of determining an image background according to another embodiment of the present disclosure.

In the actual implementation process, the image region segmentation model may include different models. As a possible implementation manner, the image region segmentation model may include a neural network. Therefore, the method of determining an image background according to an embodiment of the present disclosure is illustrated in FIG. 5. The method also includes acts in the following blocks.

At block 201, a sample face region of each sample image in an image sample set is recognized and a sample face distance is obtained based on the sample face region.

To ensure reliability of the model training, the recognized image sample set in the embodiments of the present disclosure is as rich as possible.

At block 202, a face distance parameter of each pixel in a background region and a face distance parameter of each pixel in a user region in each sample image are obtained based on the sample face distance.

At block 203, the face distance parameter and corresponding color parameter of each pixel are trained through a back-propagation algorithm by applying a preset neural network to determine neuron parameters on the neural network to obtain the image region segmentation model.

It should be understood that, the neural network has a multi-layer structure and is composed of a plurality of neuron parameters. The neural network operates based on a deep learning technology. In the embodiments of the present disclosure, the neural network is used to segment the image. That is, the neural network is used to classify the inputted face distance parameter and corresponding color parameter of each pixel. The neural network is used to a classifier. The output of the neural network is a corresponding image region type, such as a portrait region, a background region, and the like.

In actual implementation, the neural network training depends on a back-propagation algorithm: a feature vector is inputted into an input layer firstly, and one or more network layers are used to calculate to obtain an output, and an output layer finds that the output is not the same with a correct class number and lets neurons of the last layer to adjust corresponding parameters. The neurons of the last layer not only adjust own parameters, but also order the penultimate neurons connecting them to adjust corresponding parameters. Therefore, the layers are adjusted backwards. The adjusted neural network will continue to be tested on the sample. If the output is still wrong, it continues to adjust until the network output is satisfactory.

In detail, it should be understood that in the embodiments of the present disclosure, for each sample image in each image sample set, a correct image region such as a sample face region, a sample background region and a sample body region is obtained in advance. The face distance parameter and corresponding color parameter of each pixel are inputted into the neural network, and an image region segmentation result outputted by the neural network is compared with the correct image region, and the neurons parameters are adjusted according to the comparison results until results outputted by the final neural network meet requirements, such as an error is less than a certain value.

At block 104, a background region of the image is determined based on the image region type corresponding to each pixel and preset background image processing is performed on the background region.

The preset background image processing may include a background bokeh operation, a background replacement operation, and the like.

In detail, based on the image region type corresponding to each pixel, a plurality of pixels of the image region type as the background region are determined, and the background region of the image is determined based on a region composed of the plurality of pixels. Further, based on user requirements, the background image processing is performed on the background region, thereby extracting the background region based on features of more dimensions of the image, and having a higher recognition accuracy.

Certainly, in some scenarios, the user may also have processing requirements for other image regions, for example, brightness enhancement processing, sculpting processing, and the like for the user region (including the face region and the body region). Therefore, in an embodiment of the present disclosure, a user region of the image is determined based on the image region type corresponding to each pixel and preset user image processing is performed on the user region.

In conclusion, with the method of determining an image background according to embodiments of the present disclosure, the face region in the image is recognized, the face distance is obtained based on the face region and the face distance parameter of each pixel in the image is obtained based on the face distance; further, the face distance parameter and corresponding color parameter of each pixel in the image are processed by applying the pre-trained image region segmentation model to determine the image region type corresponding to each pixel; the background region of the image is determined based on the image region type corresponding to each pixel and the preset background image processing is performed on the background region.

Figure 6:
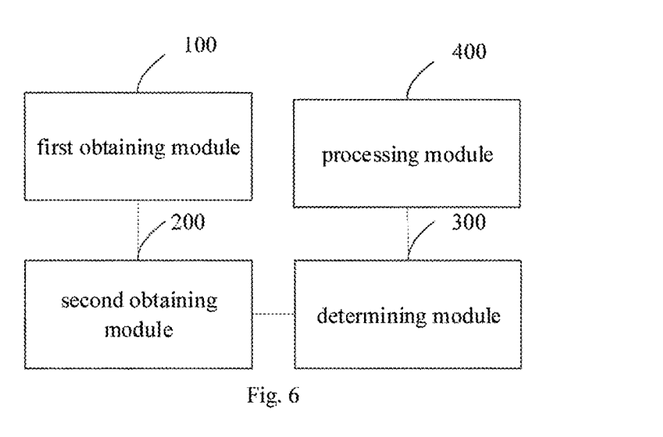
FIG. 6 is a block diagram illustrating an apparatus of determining an image background according to an embodiment of the present disclosure.

To achieve the above embodiments, the present disclosure also provides an apparatus of determining an image background. FIG. 6 is a block diagram illustrating an apparatus of determining an image background according to an embodiment of the present disclosure. As illustrated in FIG. 6, the apparatus of determining an image background may include a first obtaining module 100, a second obtaining module 200, a determining module 300 and a processing module 400.

The first obtaining module 100 is configured to recognize a face region in an image and obtain a face distance based on the face region.

In an embodiment of the present disclosure, the first obtaining module 100 is configured to detect a width of a central horizontal axis of the face region to obtain a face horizontal axis distance.

In an embodiment of the present disclosure, the first obtaining module 100 is configured to detect a length of a central vertical axis of the face region to obtain a face vertical axis distance.

In an embodiment of the present disclosure, the first obtaining module 100 is configured to detect a width of a central horizontal axis of the face region to obtain a face horizontal axis distance and detect a length of a central vertical axis of the face region to obtain a face vertical axis distance.

The second obtaining module 200 is configured to obtain a face distance parameter of each pixel in the image based on the face distance.

In an embodiment of the present disclosure, the second obtaining module 200 is configured to: detect a first distance from each pixel in the image to the central horizontal axis of the face region and calculate a first ratio of the first distance to the face horizontal axis distance.

In an embodiment of the present disclosure, the second obtaining module 200 is configured to: detect a second distance from each pixel in the image to the central vertical axis of the face region and calculate a second ratio of the second distance to the face vertical axis distance.

In an embodiment of the present disclosure, the second obtaining module 200 is configured to: detect a first distance from each pixel in the image to the central horizontal axis of the face region and calculate a first ratio of the first distance to the face horizontal axis distance; and detect a second distance from each pixel in the image to the central vertical axis of the face region and calculate a second ratio of the second distance to the face vertical axis distance.

The determining module 300 is configured to process the face distance parameter and corresponding color parameter of each pixel in the image by applying a pre-trained image region segmentation model to determine an image region type corresponding to each pixel.

The processing module 400 is configured to determine a background region of the image based on the image region type corresponding to each pixel and perform preset background image processing on the background region.

In an embodiment of the present disclosure, the processing module 400 is further configured to: determine a user region of the image based on the image region type corresponding to each pixel and perform preset user image processing on the user region.

Figure 7:
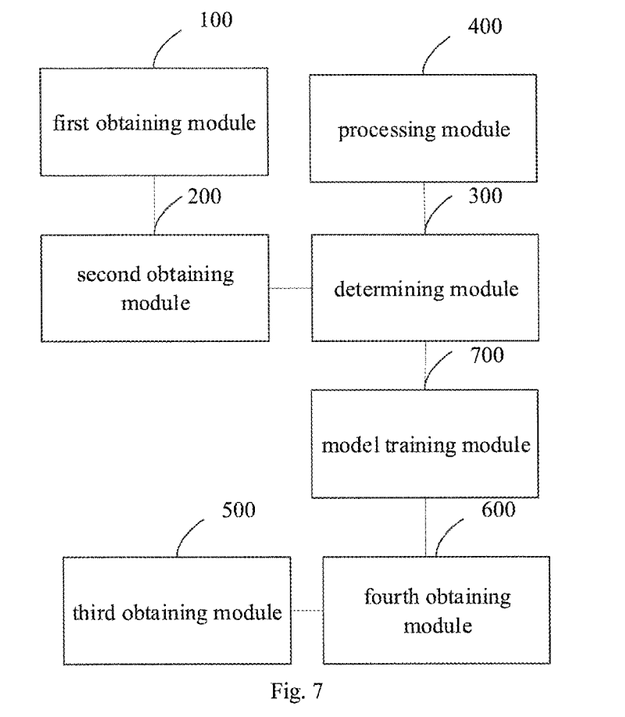
FIG. 7 is a block diagram illustrating an apparatus of determining an image background according to another embodiment of the present disclosure.

In an embodiment of the present disclosure, as illustrated in FIG. 7, the apparatus of determining an image background further includes a third obtaining module 500, a fourth obtaining module 600 and a model training module 700.

The third obtaining module 500 is configured to recognize a sample face region of each sample image in an image sample set and obtain a sample face distance based on the sample face region.

The fourth obtaining module 600 is configured to obtain a face distance parameter of each pixel in a background region and a face distance parameter of each pixel in a user region in each sample image based on the sample face distance.

The model training module 700 is configured to train the face distance parameter and corresponding color parameter of each pixel through a back-propagation algorithm by applying a preset neural network to determine neuron parameters on the neural network to obtain the image region segmentation model.

It should be noted that the foregoing description of the method embodiments is also applicable to the apparatus in the embodiments of the present disclosure. The implementation principles of them are similar, and details are not described herein again.

The division of each module in the apparatus of determining an image background is only used for illustration. In other embodiments, the apparatus of determining an image background may be divided into different modules as required to complete all or part of the functions of the apparatus of determining an image background.

In conclusion, with the apparatus of determining an image background according to embodiments of the present disclosure, the face region in the image is recognized, the face distance is obtained based on the face region and the face distance parameter of each pixel in the image is obtained based on the face distance; further, the face distance parameter and corresponding color parameter of each pixel in the image are processed by applying the pre-trained image region segmentation model to determine the image region type corresponding to each pixel; the background region of the image is determined based on the image region type corresponding to each pixel and the preset background image processing is performed on the background region.

Figure 8:
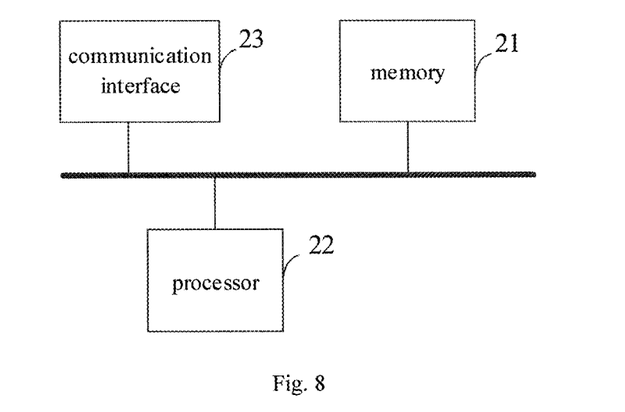
FIG. 8 is a block diagram illustrating a terminal device according to an embodiment of the present disclosure.

To achieve the above embodiments, the present disclosure also provides a terminal device. FIG. 8 is a block diagram illustrating a terminal device according to an embodiment of the present disclosure. As illustrated in FIG. 8, the device includes a memory 21, a processor 22 and computer programs stored in the memory 21 and executable by the processor 22.

When the processor 22 executes the computer programs, the method of determining an image background described in the above embodiments of the present disclosure is realized. The method of determining an image background includes the following.

At 101', a face region in an image is recognized, and a face distance is obtained based on the face region.

At 102', a face distance parameter of each pixel in the image is obtained based on the face distance.

At 103', the face distance parameter and corresponding color parameter of each pixel in the image is processed by applying a pre-trained image region segmentation model to determine an image region type corresponding to each pixel.

At 104', a background region of the image is determined based on the image region type corresponding to each pixel and preset background image processing is performed on the background region.

Further, the terminal device also includes a communication interface 23.

The communication interface 23 is configured for communication between the memory 21 and the processor 22.

The memory 21 is configured to store computer programs that run on the processor 22.

The memory 21 may include a high-speed RAM (random access memory) and may also include a non-volatile memory such as at least one disk memory.

The processor 22 is configured to implement the method of determining an image background described in the above embodiments when executing the programs.

If the memory 21, the processor 22 and the communication interface 23 are independently implemented, the communication interface 21, the memory 21 and the processor 22 may be connected to each other and complete mutual communication via a bus. The bus may be an Industry Standard Architecture (ISA) bus, a Peripheral Component (PCI) bus, or an Extended Industry Standard Architecture (EISA) bus. The bus may be divided into an address bus, a data bus, a control bus, and the like. For ease of illustration, only one thick line is illustrated in FIG. 8, but it does not mean that there is only one bus or one type of bus.

In a specific implementation, if the memory 21, the processor 22 and the communication interface 23 are integrated on one chip, the memory 21, the processor 22 and the communication interface 23 may complete mutual communication through an internal interface.

The processor 22 may be a Central Processing Unit (CPU) or an Application Specific Integrated Circuit (ASIC) or may be configured as an integrated circuit to implement one or more of the embodiments of the present disclosure.

To achieve the above embodiments, the present disclosure also provides a computer program product. When instructions in the computer program product are executed by a processor, the method of determining an image background described in the above embodiments is implemented. The method of determining an image background includes the following acts.

A face region in an image is recognized, and a face distance is obtained based on the face region.

A face distance parameter of each pixel in the image is obtained based on the face distance.

The face distance parameter and corresponding color parameter of each pixel in the image is processed by applying a pre-trained image region segmentation model to determine an image region type corresponding to each pixel.

A background region of the image is determined based on the image region type corresponding to each pixel and preset background image processing is performed on the background region.

To achieve the above embodiments, the present disclosure also provides a non-transitory computer readable storage medium, having stored therein a computer program that, when executed by a processor, causes the processor to perform the method of determining an image background described in the above embodiments. The method of determining an image background includes the following acts.

A face region in an image is recognized, and a face distance is obtained based on the face region.

A face distance parameter of each pixel in the image is obtained based on the face distance.

The face distance parameter and corresponding color parameter of each pixel in the image is processed by applying a pre-trained image region segmentation model to determine an image region type corresponding to each pixel.

A background region of the image is determined based on the image region type corresponding to each pixel and preset background image processing is performed on the background region.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Without a contradiction, the different embodiments or examples and the features of the different embodiments or examples can be combined by those skilled in the art.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method of determining an image background, comprising:
    recognizing a face region in an image, and obtaining a face distance based on the face region;
    obtaining a face distance parameter of each pixel in the image based on the face distance;
    processing the face distance parameter and corresponding color parameter of each pixel in the image by applying a pre-trained image region segmentation model to determine an image region type corresponding to each pixel;
    determining a background region of the image based on the image region type corresponding to each pixel and performing preset background image processing on the background region;
    wherein obtaining the face distance based on the face region comprises:
        detecting a width of a central horizontal axis of the face region to obtain a face horizontal axis distance; and/or,
        detecting a length of a central vertical axis of the face region to obtain a face vertical axis distance; and
    wherein obtaining the face distance parameter of each pixel in the image based on the face distance comprises:
        detecting a first distance from each pixel in the image to the central horizontal axis of the face region and calculating a first ratio of the first distance to the face horizontal axis distance;
        and/or,
        detecting a second distance from each pixel in the image to the central vertical axis of the face region and calculating a second ratio of the second distance to the face vertical axis distance.

2. The method according to claim 1, further comprising:
    recognizing a sample face region of each sample image in an image sample set, and obtaining a sample face distance based on the sample face region;
    obtaining a face distance parameter of each pixel in a background region and a face distance parameter of each pixel in a user region in each sample image based on the sample face distance;
    training the face distance parameter and corresponding color parameter of each pixel through a back-propagation algorithm by applying a preset neural network to determine neuron parameters on the neural network to obtain the image region segmentation model.

3. The method according to claim 1, further comprising:
    determining a user region of the image based on the image region type corresponding to each pixel and performing preset user image processing on the user region.

4. A terminal device, comprising a memory, a processor and computer programs stored in the memory and executable by the processor, wherein when the computer programs are executed by the processor, the processor is configured to perform acts of:
    recognizing a face region in an image, and obtaining a face distance based on the face region;
    obtaining a face distance parameter of each pixel in the image based on the face distance;
    processing the face distance parameter and corresponding color parameter of each pixel in the image by applying a pre-trained image region segmentation model to determine an image region type corresponding to each pixel;
    determining a background region of the image based on the image region type corresponding to each pixel and performing preset background image processing on the background region;
    wherein the processor is configured to obtain the face distance based on the face region by acts of:
        detecting a width of a central horizontal axis of the face region to obtain a face horizontal axis distance; and/or, detecting a length of a central vertical axis of the face region to obtain a face vertical axis distance; and wherein the processor is configured to obtain the face distance parameter of each pixel in the image based on the face distance by acts of:

detecting a first distance from each pixel in the image to the central horizontal axis of the face region and calculating a first ratio of the first distance to the face horizontal axis distance;

and/or, detecting a second distance from each pixel in the image to the central vertical axis of the face region and calculating a second ratio of the second distance to the face vertical axis distance.

5. The terminal device according to claim 4, wherein the processor is further configured to perform acts of:

recognizing a sample face region of each sample image in an image sample set, and obtaining a sample face distance based on the sample face region;

obtaining a face distance parameter of each pixel in a background region and a face distance parameter of each pixel in a user region in each sample image based on the sample face distance;

training the face distance parameter and corresponding color parameter of each pixel through a back-propagation algorithm by applying a preset neural network to determine neuron parameters on the neural network to obtain the image region segmentation model.

6. The terminal device according to claim 4, wherein the processor is further configured to perform acts of:

determining a user region of the image based on the image region type corresponding to each pixel and performing preset user image processing on the user region.

7. A non-transitory computer readable storage medium, having stored therein computer programs that, when executed by a processor, causes the processor to perform a method of determining an image background, the method comprises:

recognizing a face region in an image, and obtaining a face distance based on the face region;

obtaining a face distance parameter of each pixel in the image based on the face distance;

processing the face distance parameter and corresponding color parameter of each pixel in the image by applying a pre-trained image region segmentation model to determine an image region type corresponding to each pixel;

determining a background region of the image based on the image region type corresponding to each pixel and performing preset background image processing on the background region;

wherein obtaining the face distance based on the face region comprises:

detecting a width of a central horizontal axis of the face region to obtain a face horizontal axis distance;

and/or, detecting a length of a central vertical axis of the face region to obtain a face vertical axis distance; and wherein obtaining the face distance parameter of each pixel in the image based on the face distance comprises:

detecting a first distance from each pixel in the image to the central horizontal axis of the face region and calculating a first ratio of the first distance to the face horizontal axis distance;

and/or, detecting a second distance from each pixel in the image to the central vertical axis of the face region and calculating a second ratio of the second distance to the face vertical axis distance.

8. The non-transitory computer readable storage medium according to claim 7, wherein the method further comprises:

recognizing a sample face region of each sample image in an image sample set, and obtaining a sample face distance based on the sample face region;

obtaining a face distance parameter of each pixel in a background region and a face distance parameter of each pixel in a user region in each sample image based on the sample face distance;

training the face distance parameter and corresponding color parameter of each pixel through a back-propagation algorithm by applying a preset neural network to determine neuron parameters on the neural network to obtain the image region segmentation model.

9. The non-transitory computer readable storage medium according to claim 7, wherein the method further comprises:

determining a user region of the image based on the image region type corresponding to each pixel and performing preset user image processing on the user region.

* * * * *